United States Patent [19]

Falk

[11] Patent Number: 5,360,065
[45] Date of Patent: Nov. 1, 1994

[54] SCALE INHIBITOR AND PROCESS FOR USING

[75] Inventor: David O. Falk, Denver, Colo.

[73] Assignee: Marathon Oil Company, Findlay, Ohio

[21] Appl. No.: 85,276

[22] Filed: Jun. 29, 1993

[51] Int. Cl.$^5$ .................. E21B 47/00; E21B 37/06; C02F 5/10

[52] U.S. Cl. .................. 166/250; 166/279; 166/310; 166/371; 210/698; 210/701; 252/8.552

[58] Field of Search .............. 166/279, 244.1, 250, 166/310, 371; 210/698, 701; 252/8.552, 180

[56]     References Cited

U.S. PATENT DOCUMENTS

| | | | |
|---|---|---|---|
| 3,395,757 | 8/1968 | Crossland | 252/8.552 X |
| 3,483,925 | 12/1969 | Slyker | 166/279 |
| 3,682,831 | 8/1972 | Tate | 252/8.552 X |
| 4,455,235 | 6/1984 | Boutin et al. | 210/698 X |
| 4,469,615 | 9/1984 | Tsuruoka et al. | 210/698 X |
| 4,710,303 | 12/1987 | Emmons | 210/698 |
| 4,762,626 | 8/1988 | Emmons et al. | 166/279 X |
| 4,898,677 | 2/1990 | Brase | 210/698 |
| 4,937,002 | 6/1990 | Bainbridge et al. | 252/8.552 X |
| 5,092,404 | 3/1992 | Falk | 166/250 |
| 5,263,539 | 11/1993 | Salimi et al. | 252/8.552 X |

Primary Examiner—George A. Suchfield

[57]     ABSTRACT

A copolymer of sodium vinyl sulfonate and polyalkylene glycol mono- or di-methacrylate and a process for inhibiting scale deposition, particularly inorganic sulfate such as barium sulfate. An aqueous fluid present in or produced from a subterranean formation is contacted with an aqueous solution having the copolymer dissolved therein. The aqueous fluid has an acidic pH and the copolymer has a molecular weight of from about 2,000 to about 30,000.

25 Claims, No Drawings

SCALE INHIBITOR AND PROCESS FOR USING

BACKGROUND OF INVENTION

The present invention relates to a scale inhibitor which is copolymer of sodium vinyl sulfonate and polyalkylene glycol mono- or di-methacrylate, and more particularly, to a process for inhibiting the deposition of scale, particularly inorganic sulfate scale, from aqueous fluids present in or produced from a subterranean formation.

Precipitation of inorganic salts, such as calcium carbonate and calcium, barium, and strontium sulfate, as scale deposits is a persistent and common problem encountered in many field operations for the recovery of hydrocarbons from subterranean formations. Commingling of incompatible aqueous fluids during field operations, especially enhanced oil recovery (EOR) operations involving a waterflood or water drive, results in scale formation and deposition in the formation and in production equipment and tubing. Two or more aqueous fluids are incompatible if each fluid contains distinct ions which form a precipitate and deposit as a scale when the two or more aqueous fluids are commingled. Usually the connate water or brine present in a reservoir will contain barium, calcium and/or strontium ions while water injected into the subterranean formation during EOR operations will contain sulfate ions. For example, offshore operations may involve the injection of large volumes of sea water containing a relatively large concentration of sulfate ions into a subterranean formation having brine containing relatively large concentrations of barium, calcium, and strontium. Upon mixing of the aqueous fluids in situ, precipitation of barium, calcium, or strontium sulfate will occur in the formation and the subsurface and surface production equipment and/or tubing. Commingling of incompatible aqueous fluids usually occurs within the near production well bore environment of a subterranean formation.

Injection of carbon dioxide into a subterranean hydrocarbon-bearing formation as an EOR method results in absorption of carbon dioxide by connate water present in the formation. In addition, some subterranean formation brines, such as those found in the North Sea, may naturally contain a relatively large concentration of carbon dioxide. As pressure is reduced, for example during production, carbon dioxide flashes off to the gas phase thereby increasing the pH of the aqueous fluids and permitting formation of calcium carbonate scale predominantly in the near production well bore environment of the formation and in subsurface and surface production equipment and/or tubing.

Conventional removal of scale which is formed within a subterranean formation and the subsurface and surface production equipment and tubing is costly and ineffective. Scale removal by repeated injection of a chemical agent is relatively expensive. Thus, scale has been removed utilizing various mechanical devices, such as impact jets and/or cavitation jets. As the downtime associated with pulling production tubing and cleaning such tubing above ground is expensive, particularly in offshore locations, wells are cleaned downhole after killing the well. Such mechanical cleaning is time-consuming, relatively inefficient, and potentially hazardous where a radioactive precipitate, for example radium sulfate, is present in the scale to be removed.

Inhibition of scale deposition has been advanced as a more feasible, and accordingly preferable, approach to effectively reducing scale deposition. Conventional commercial scale inhibitors consist primarily of polyelectrolytes, such as polycarboxylates or polyphosphonates. However, the effectiveness of such polyelectrolyte scale inhibitors significantly depends upon the degree of ionization of these inhibitors at the pH value of connate waters. At relatively low pH values, e.g. equal to or less than about 6.0, the effectiveness of a conventional polyelectrolyte scale inhibitor to inhibit barium, calcium, or strontium sulfate scale formation significantly decreases. In addition, conventional polyelectrolyte scale inhibitors utilized to inhibit inorganic sulfate scale dissolve calcium carbonate scale thereby increasing calcium ion concentration which causes undesirable precipitation of the conventional polyelectrolyte scale inhibitors.

Recently, relatively high molecular weight polyvinyl sulfonate has been used to inhibit scale deposition, particularly inorganic sulfate deposition, from aqueous fluid present in and/or produced from a subterranean formation. Such polyvinyl sulfonate is dissolved in an aqueous solution which is preferably squeezed into a subterranean formation. In accordance with a squeeze technique, an aqueous solution of a scale inhibitor, such as polyvinyl sulfonate, is injected into a subterranean formation via a production well bore in fluid communication therewith and can be followed by an overflush, for example a brine containing a relatively low quantity of sulfate ions, i.e. a brine which is compatible with formation fluids. The production well bore may be shut in for a suitable period, for example, zero to twenty-four hours. The polyvinyl sulfonate is absorbed within formation matrix during the shut-in period and is subsequently desorbed over a period of time into aqueous fluids present in and produced from the formation to effectively inhibit scale deposition, particularly inorganic sulfate scale such as barium sulfate scale. After the shut in period, the production well bore is returned to production and aqueous fluids produced from the subterranean formation are analyzed for inhibitor concentration to ensure that an appropriate concentration of inhibitor is present in produced fluids to effectively inhibit scale deposition and to determine the need for subsequent squeeze treatments. Since high molecular weight polyvinyl sulfonates are relatively expensive, a need exists to improve the absorption of such polyvinyl sulfonates into subterranean formation matrix so as to increase the period of time over which polyvinyl sulfonate is subsequently desorbed into aqueous fluids present in and produced from the formation and thereby increase the cost effectiveness of the treatment.

Accordingly, it is an object of the present invention to increase the amount of scale inhibitor which is absorbed within the matrix of a subterranean formation during a process for inhibiting scale deposition.

It is another object of the present invention to increase the period of time over which a scale inhibitor is desorbed from the matrix of a subterranean formation into fluids present in and produced from the subterranean formation in a process for inhibiting scale deposition.

It is a further object of the present invention to increase the cost effectiveness of processes for inhibiting scale deposition in fluids present in and produced from a subterranean formation.

SUMMARY OF INVENTION

To achieve the foregoing and other objects, and in accordance with the purposes of the present invention, as embodied and broadly described herein, one characterization of the present invention is a process for inhibiting scale including barium sulfate in aqueous fluid present in or produced from a subterranean formation. The process comprises contacting the aqueous fluid with an amount of a copolymer of sodium vinyl sulfonate and polyalkylene glycol mono- or di-methacrylate which is effective to inhibit formation of scale in the aqueous fluid. The copolymer has a molecular weight of from about 2,000 to about 30,000.

In another characterization of the present invention, a scale inhibitor is provided which comprises a copolymer of sodium vinyl sulfonate and polyalkylene glycol mono- or di-methacrylate having a molecular weight of from about 2,000 to about 30,000.

In a further characterization of the present invention, a composition is provided for inhibiting scale. The composition comprises an aqueous solution having a copolymer of sodium vinyl sulfonate and polyalkylene glycol mono- or di-methacrylate dissolved therein in a quantity effective to inhibit scale formation. The copolymer has a molecular weight of from about 2,000 to about 30,000.

DESCRIPTION OF THE PREFERRED EMBODIMENTS

The present invention relates to a scale inhibitor composition comprising an aqueous solution having a copolymer of sodium vinyl sulfonate and polyalkylene glycol mono- or di-methacrylate dissolved therein and to a process which employs this scale inhibitor composition to effectively inhibit the deposition of scale, particularly inorganic sulfate scale, from aqueous fluids present in a subterranean formation and subsurface and/or surface hydrocarbon production tubing and/or equipment. As utilized throughout this specification, the term "molecular weight" refers to the weight average molecular weight of the copolymer of sodium vinyl sulfonate and polyalkylene glycol mono- or di-methacrylate. The weight average molecular weight is determined from experiments in which each molecule or chain makes a contribution to the measured result. The weight average molecular weights reported in this specification were determined using a size exclusion chromatographic determination of molecular weights which employed a column packed with a polymeric gel. As also utilized throughout this specification, the term "polydispersity" refers to the weight average molecular weight of a copolymer of sodium vinyl sulfonate and polyalkylene glycol mono- or di-methacrylate divided by the number average molecular weight of a copolymer of sodium vinyl sulfonate and polyalkylene glycol mono- or di-methacrylate. The number average molecular weight is calculated by dividing the sum of the individual molecular weight values by the number of molecules. The term "alkylene" as used herein is inclusive of ethylene, propylene and/or butylene.

In accordance with the present invention, an aqueous solution having a copolymer of sodium vinyl sulfonate and polyalkylene glycol mono- or di-methacrylate dissolved therein is injected into a subterranean formation via a production well in fluid communication therewith to effectively inhibit scale formation, particularly inorganic sulfate scale such as barium sulfate, in aqueous fluids present in the formation and/or in surface and subsurface production tubing and/or equipment when the well is returned to production. It is believed that utilizing a copolymer of sodium vinyl sulfonate and polyalkylene glycol mono- or di-methacrylate significantly improves the effective life of a scale inhibitor treatment in aqueous fluids present in and/or produced from a subterranean formation. The polyalkylene glycol mono- or di-methacrylate portion of the copolymer functions to absorb the copolymer onto a subterranean matrix to a significantly greater degree than use of polyvinyl sulfonate per se as a scale inhibitor. Polyethylene glycol monomethyacylate is the preferred polyalkylene glycol mono or di-methacrylate.

The copolymer of the present invention is thermally stable and has a molecular weight of from about 2,000 to about 30,000, preferably from 5,000 to about 30,000, and more preferably from about 10,000 to about 25,000. Preferably, the copolymer has a polydispersity of less than about 2.0. The copolymer of present invention is prepared by polymerizing a commercially available aqueous solution of vinyl sulfonic acid, sodium salt, such as that manufactured by Air Products & Chemicals, Inc., Aldrich Chemical Co., Inc. or Farbwerke Hoechst AG with a polyalkylene glycol mono- or di-methacrylate monomer in liquid form, such as a polyethylene glycol monomethacrylate which is commercially available from Dajac Laboratories. Examples of commercially available aqueous solutions of vinyl sulfonic acid, sodium salt, are 25 and 30 weight percent aqueous solutions of vinyl sulfonic acid, sodium salt, which are commercially available from Air Products & Chemicals, Inc. and Farbwerke Hoechst AG, respectively. As received the vinyl sulfonic acid, sodium salt, solution may contain a polymerization inhibitor, e.g. 100 ppm of methylether hydroquinone. In such cases, the particular polymerization inhibitor employed can be extracted by passing the monomer, i.e. the vinyl sulfonic acid, sodium salt, slowly through a column packed with a suitable resin as will be evident to a skilled artisan. The liquid polyethylene glycol monomethyacrylate monomer is then added to the monomer solution, and the monomer solution is purged for about an hour with nitrogen at room temperature while the solution is stirred to remove oxygen therefrom. The ratio of polyethylene glycol monomethacrylate monomer added to vinyl sulfonic acid, sodium salt solution is selected to obtain a copolymer within the molecular weight ranges specified above and is dependent upon the molecular weight of each monomer as will be evident to the skilled artisan. Suitable catalysts, such as tetramethylethylenediamine and ammonium persulfate, are added to separate volumes of nitrogen purged water and then a predetermined amount of each resulting aqueous catalyst solution is added to the monomer solution at room temperature. The resulting solution is continually stirred at a temperature of from about 65 to about 125° F. for a sufficient period to allow for maximum conversion of the monomers to the copolymer of the present invention. Thereafter, if the resultant polymerization solution contains deleterious by-products of sulfonation, such as sulfate ions or hydroxyethyl sulfonate, the copolymer of the present invention can be separated from these deleterious by-products of sulfonation by any suitable method, for example by addition of methanol to effect a liquid/liquid separation, as will be evident to the skilled artisan.

The aqueous solution of scale inhibitor of the present invention which is manufactured as described above is usually diluted prior to use to obtain a concentration of copolymer of the present invention which is effective to inhibit the formation of scale in aqueous fluids present in and/or produced from the subterranean formation. The aqueous solution may be a brine which preferably contains a low concentration of sulfate ions. The aqueous solution having the copolymer of the present invention dissolved therein can be introduced into contact with aqueous fluids present in a subterranean formation and/or in surface and/or subsurface production tubing and/or equipment in any suitable manner known to those skilled in the art. For example, the aqueous copolymer solution may be metered into aqueous fluid present in a production well bore through a small diameter tube, e.g. ¼–1 inch, may be injected through a gas lift valve, or may be encapsulated and introduced into a production well bore. However, the aqueous solution having the copolymer dissolved therein is preferably squeezed into the subterranean formation. In accordance with a squeeze technique, an aqueous solution of the copolymer of the present invention is injected into a subterranean formation via a production well bore in fluid communication therewith and can be followed by an overflush, for example a brine containing a relatively low quantity of sulfate ions, i.e. a brine which is compatible with formation fluids. The production well bore may be shut in for a suitable period, for example, zero to twenty-four hours, and thereafter is returned to production. The copolymer is absorbed both onto and within formation matrix during the shut-in period and is subsequently desorbed over a period of time into aqueous fluids present in and produced from the formation to effectively inhibit scale deposition, particularly inorganic sulfate scale such as barium sulfate scale. The copolymer of the present invention should be incorporated into an aqueous solution to be squeezed into a subterranean formation in an amount of from about 0.4 to about 25 volume percent, more preferably in an amount of from about 2 to about 20 volume percent, and most preferably in an amount of from about 5 to about 10 volume percent, of the solution to effectively inhibit scale formation upon being desorbed into aqueous fluids present in and produced from the formation. As previously mentioned, the aqueous solution may be a brine which preferably contains a low concentration of sulfate ions. Subsequent to the squeeze treatment, aqueous fluids produced from the subterranean formation will be analyzed for inhibitor concentration to ensure that an appropriate concentration of inhibitor is present in produced fluids to effectively inhibit scale deposition and to determine the need for subsequent squeeze treatments. Preferably, the concentration of inhibitor present in produced fluids is at least about 40 ppm, more preferably is at least about 50 ppm, and most preferably is at least about 100 ppm.

The process of the present invention can be utilized to inhibit scale, particularly inorganic sulfate scale such as barium sulfate scale, from aqueous fluids contained in and/or produced from any subterranean formation in which incompatible aqueous fluids may commingle, for example, during an EOR operation, and/or in which the aqueous fluids present in the formation contain a relatively large concentration of carbon dioxide. Preferably, the scale inhibitor and process of the present invention are employed to effectively inhibit scale from aqueous fluids present in or produced from a subterranean formation which have an acidic pH, i.e. a pH less than about 7.0. The process of the present invention is applicable to a wide variety of subterranean formation temperatures and mineralogies.

The following examples demonstrate the practice and utility of the present invention, but are not to be construed as limiting the scope thereof.

EXAMPLE 1

A 25 wt % solution of vinyl sulfonic acid, sodium salt monomer (molecular weight 200) is passed through a resin column to remove methylether hydroquinone which is employed as a polymerization inhibitor for the vinyl sulfonic acid, sodium salt monomer during transportation. 100 g of vinyl sulfonic acid, sodium salt solution and 1 g of polyethylene glycol monomethacrylate monomer are charged to a reaction flask and purged with nitrogen at room temperature for two hours while stirring to remove oxygen therefrom. Tetramethylethylenediamine is added to 25 ml of nitrogen purged distilled water in an amount to obtain a tetramethyl-ethylenediamine concentration of 0.075 mg/ml in the subsequently formulated reaction solution. Ammonium persulfate is added to 25 ml of nitrogen purged distilled water in an amount to obtain an ammonium persulfate concentration of 0.175 mg/ml in the subsequently formulated reaction solution. One ml of the resultant tetramethyl-ethylenediamine solution and 1 ml of the resultant ammonium persulfate solution are separately injected into the solution present in the reaction flask and the resultant reaction solution is stirred and allowed to polymerize at 69–75° F. with a nitrogen purge for twenty-four hours. The final pH of the reaction solution is 9.4. This reaction results in 58% conversion of the monomers to a copolymer of sodium vinyl sulfonate and polyethylene glycol monomethacrylate which is determined to have a molecular weight of 17,399, a polydispersity of 1.81, and a comonomer ratio of sodium vinyl sulfonate to polyethylene glycol monomethacrylate of 30:1.

EXAMPLE 2

The polymerization reaction set forth in Example 1 is repeated except that the polymerization is allowed to proceed at 69–71° F. and the concentration of polyethylene glycol monomethacrylate in the reaction solution is doubled. This polymerization reaction results in 56% conversion of monomer to copolymer which is determined to have a molecular weight of 24,154, a polydispersity of 2.15, and a comonomer ratio of 30:2. The final pH of the reaction solution is 9.5.

EXAMPLE 3

The polymerization reaction set forth in Example 2 is repeated except that the molecular weight of the polyethylene glycol monomethyacrylate monomer is increased from 200 to 400 and the comonomer ratio is increased to 30:1. This polymerization reaction results in 67% conversion of monomer to copolymer which is determined to have a molecular weight of 22,772 and a polydispersity of 1.87. The final pH of the reaction solution is 9.5.

EXAMPLE 4

The polymerization reaction of Example 1 is repeated except that the polymerization is allowed to proceed at a reaction temperature of 109°–125° F. The polymerization reaction results in a 64% conversion of monomer to a copolymer which is determined to have a molecular weight of 13,168, a polydispersity of 1.70, and a comonomer ratio of sodium vinyl sulfonate to polyethylene glycol monomethacrylate of 30:1. The final pH of the reaction solution is 9.25.

EXAMPLE 5

The polymerization reaction of Example 1 is repeated except that tetramethyl-ethylenediamine is added to 25 ml of purged distilled water in an amount to obtain a concentration of 0.15 mg/ml in the reaction solution. The polymerization is allowed to proceed at a reaction temperature of 101°–120° F. This polymerization reaction results in a 49% conversion of monomer to copolymer which is determined to have a molecular weight of 15,329, a polydispersity of 1.70, and a comonomer ratio of sodium vinyl sulfonate to polyethylene glycol monomethacrylate of 30:1. The final pH of the reaction solution is 9.6.

EXAMPLE 6

The polymerization reaction of Example 1 is repeated except that tetramethyl-ethylenediamine is added to 25 ml of nitrogen purged distilled water in an amount to obtain 0.15 mg/ml in the reaction solution. Ammonium persulfate concentration is added to 25 ml of nitrogen purged distilled water in an amount to obtain a concentration of 0.35 mg/ml in the reaction solution. Polymerization occurs at a reaction temperature ranging from about 117° F. to about 124° F. This polymerization reaction results in a 77% conversion of monomer to copolymer which is determined to have a molecular weight of 11,471, a polydispersity of 1.64, and a comonomer ratio of 30:1. The final pH of the reaction solution is 9.0.

EXAMPLE 7

The polymerization reaction set forth in Example 1 is repeated except that the polymerization is allowed to proceed at 130° F., the catalyst concentration in the reaction solution is 0.33 mg/ml, and the concentration of polyethylene glycol monomethacrylate monomer in the reaction solution is decreased by one-fourth. This polymerization reaction results in 90% conversion of monomer to copolymer which is determined to have a molecular weight of about 1,800, a polydispersity of about 1.7 and a comonomer ratio of 60:1. The final pH of the reaction solution is 8.0.

EXAMPLE 8

The polymerization reaction set forth in Example 1 is repeated except that the polymerization is allowed to proceed at 80° F., the catalyst concentration in the reaction solution is 0.7 mg/ml, and the concentration of polyethylene glycol monomethyacrylate monomer in the reaction solution is decreased by one-half. This polymerization reaction results in a 70% conversion of monomer to copolymer which is determined to have a molecular weight of about 7,000, a polydispersity of about 1.9 and a comonomer ratio of 30:1. The final pH of the reaction solution is 8.0.

The foregoing examples demonstrate the polymerization process to be employed to obtain a copolymer of sodium vinyl sulfonate and polyethylene glycol monomethacrylate having a molecular weight of from about 2,000 to about 30,000 which is useful as an improved scale inhibitor, especially for barium sulfate scale, in accordance with the present invention.

EXAMPLE 9

The efficiency of the copolymer of sodium vinyl sulfonate and polyethylene glycol monomethacrylate obtained from the procedures demonstrated in Examples 1 and 3–6 above in inhibiting barium sulfate scale is determined utilizing the following tube-filter blocking test procedures. The pH of a brine A having 2.465 g of $CaCl_2.2H_2O$, 5.253 g of $MgCl_2.6H_2O$, 2.177 g of $BaCl_2.2H_2O$, 0.157 g of $SrCl_2.6H_2O$, 3.486 g KCl, and 55.626 g of NaCl per liter is adjusted to a pH of 4 by adding hydrochloric acid to lower the pH. 100 ppm of the particular aqueous solutions containing a copolymer of sodium vinyl sulfonate and polyethylene glycol monomethacrylate which are obtained in Examples 1 and 3–6 above and are to be tested are added to 100 ml of brine B containing 60.155 g NaCl and 1.597 g of $Na_2SO_4$ per liter in preparation for testing. The pH of the resultant brine B mixture is adjusted to pH 4 by adding hydrochloric acid to lower the pH.

A tube-filter blocking unit is utilized to evaluate each copolymer's ability to inhibit barium sulfate scale deposition in a dynamic environment. The tube-filter unit is of a conventional design in which each brine solution is stored in separate reservoirs and transported by means of separate high pressure liquid chromatography pumps through separate preheat coils to a mixing tee wherein brines A and B are mixed under parallel flow as previously mentioned. Brine B contains a particular aqueous solution having a copolymer of the present invention as obtained in Examples 1 and 3–6 dissolved therein. Mixing of equal volumes of brines A and B simulates an 80% formation or connate water and 20% seawater brine which is representative of an aqueous formation fluid obtained when North Sea seawater is utilized as a drive fluid in a Brae field subterranean formation. The Brae field is located in the United Kingdom section of the North Sea.

The resulting mixture is immediately passed into a capillary tube having a 0.125 inch O.D., a 0.055 inch I.D., and a length of one meter. Each brine is injected at flow rates of 5 ml/min. for a total flow rate of 10 ml/min. An in-line filter manufactured by Neupro Co. of Willoughby, Ohio is positioned at the end of the capillary tube. Both the capillary tube and the in-line mixer are constructed of 316 stainless steel and are treated with an aqueous solution of 20 wt % nitric acid to pacify their brine-exposed surfaces. Transducers are used to continuously monitor pressure differentials across the capillary tube and in-line filter. A back pressure regulator is used to permit unit operation at high temperatures. Times to achieve a 50 psig and 100 psig pressure differentials across both the capillary tube and in-line filters are measured and recoded. A maximum 360 minute run time is dictated by the brine reservoir capacity for uninterrupted flow. The results of this testing are set forth in Table 1 below.

TABLE 1

| Inhibitor | | Time (minutes) for $\Delta P$ | | | |
|---|---|---|---|---|---|
| | Copolymer | Capillary Tube | | Filter | |
| Sample | Conc (ppm) | 50 psig | 100 psig | 50 psig | 100 psig |
| Example 1 | 40 | 94.5 | 96.9 | — | — |
| | 50 | 189.3 | 191.8 | — | — |
| | 100 | — | — | 351.5 | 360.2 |
| Example 3 | 40 | 101.1 | 103.7 | — | — |
| | 50 | 132.0 | 135.5 | — | — |
| | 100 | — | — | 2 psig at 360 min | |
| Example 4 | 40 | 157.7 | 159.5 | — | — |

TABLE 1-continued

| Sample | Inhibitor Copolymer Conc (ppm) | Time (minutes) for ΔP | | | |
|---|---|---|---|---|---|
| | | Capillary Tube | | Filter | |
| | | 50 psig | 100 psig | 50 psig | 100 psig |
| | 50 | 205.4 | 208.2 | — | — |
| | 100 | — | — | 137.3 | 142.5 |
| Example 5 | 40 | 43.7 | 47.0 | — | — |
| | 50 | 150.3 | 154.2 | — | — |
| | 100 | — | — | 147.3 | 155.8 |
| Example 6 | 40 | 194.9 | 196.3 | — | — |
| | 50 | No ΔP at 360 min | | 215.3 | 224.1 |
| | 100 | — | — | 178.2 | 184.3 |

EXAMPLE 10

The efficiency of the copolymers of sodium vinyl sulfonate and polyethylene glycol monomethylacrylate obtained from the procedures outlined in Examples 7 and 8 above is determined utilizing the tube-filter blocking test procedures as employed in Example 9. The results of such testing are set forth in Table 2 below.

TABLE 2

| Sample | Inhibitor Copolymer Conc (ppm) | Time (minutes) for ΔP | | | |
|---|---|---|---|---|---|
| | | Capillary Tube | | Filter | |
| | | 50 psig | 100 psig | 50 psig | 100 psig |
| Example 7 | 40 | 150 | 145 | — | — |
| | 50 | None | None | 200 | 200 |
| | 100 | — | — | 180 | 180 |
| Example 8 | 40 | 170 | 165 | — | — |
| | 50 | None | None | 200 | 200 |
| | 100 | — | — | 170 | 170 |

EXAMPLE 11

Separate and equal volume mixture of brines A and B which does not contain the copolymer of the present invention are tested utilizing the tube-filter blocking test procedures as outlined in Example 9 to establish a baseline to evaluate the results of Examples 9 and 10. The results of this testing are set forth in Table 3 below.

TABLE 3

| Sample | Inhibitor Copolymer Conc (ppm) | Time (minutes) for ΔP | | | |
|---|---|---|---|---|---|
| | | Capillary Tube | | Filter | |
| | | 50 psig | 100 psig | 50 psig | 100 psig |
| Blank | 0 | 8.4 | 9.3 | — | — |
| | 0 | 8.9 | 9.9 | — | — |
| | 0 | 8.6 | 9.6 | — | — |
| | 0 | 9.0 | 10.0 | — | — |

As indicated by the results of Examples 9–11, use of a copolymer of sodium vinyl sulfonate and a polyalkylene glycol mono- or di-methacrylate having a molecular weight of from about 2,000 to about 30,000 results in a significant increase in the elapsed time necessary to achieve a 50 and 100 psig pressure differential in the tube-filter, and therefore in the inhibition of scale, such as barium sulfate.

It is important to note that an aqueous solution containing the copolymer scale inhibitor of the present invention does not dissolve calcium carbonate scale to any appreciable degree when injected into a subterranean formation via a production well bore. Accordingly, the presence of calcium carbonate scale in a production well bore or the near well bore environment of a formation does not adversely affect the efficiency of the scale inhibitor of the present invention, i.e. copolymer of sodium vinyl sulfonate and polyalkylene glycol mono- or di-methyacrylate.

While the foregoing preferred embodiments of the invention have been described and shown, it is understood that the alternatives and modifications, such as those suggested and others, may be made thereto and fall within the scope of the invention.

I claim:

1. A process for inhibiting scale including barium sulfate in aqueous fluid and being present in or produced from a subterranean formation, the process comprising:
   contacting said aqueous fluid with an amount of a copolymer of sodium vinyl sulfonate and polyalkylene glycol mono- or di-methacrylate which is effective to inhibit formation of said scale in said aqueous fluid, said copolymer having a molecular weight of from about 2,000 to about 30,000.

2. The process of claim 1 further comprising:
   injecting an aqueous solution having said copolymer dissolved therein into said subterranean formation via a well bore in fluid communication with said subterranean formation, said copolymer being absorbed within a matrix of said subterranean formation, said step of contacting being performed as said copolymer is desorbed from said matrix into said aqueous fluid.

3. The process of claim 2 wherein said copolymer is dissolved into said aqueous solution in an amount of from about 0.4 to about 25 volume percent of the solution.

4. The process of claim 3 wherein said copolymer is dissolved into said aqueous solution in an amount of from about 2 to about 20 volume percent of the solution.

5. The process of claim 4 wherein said copolymer is dissolved into said aqueous solution in an amount of from about 5 to about 10 volume percent of the solution.

6. The process of claim 2 further comprising:
   determining the concentration of copolymer in said aqueous fluid produced from said subterranean formation.

7. The process of claim 6 wherein said concentration of copolymer in said aqueous fluid produced from said formation is determined to be below a predetermined value, the process further comprising:
   repeating said injection of said aqueous solution having copolymer dissolved therein into said subterranean formation.

8. The process of claim 7 wherein said predetermined value is 40 ppm.

9. The process of claim 7 wherein said predetermined value is 50 ppm.

10. The process of claim 7 wherein said predetermined value is 100 ppm.

11. The process of claim 2 further comprising:
    injecting a second aqueous solution into said subterranean formation via said well bore to displace said aqueous solution having copolymer dissolved therein.

12. The process of claim 1 wherein said well bore is a production well bore, said process further comprising:
    shutting in said well bore for a predetermined period of time subsequent to said step of injecting said second aqueous solution.

13. The process of claim 2 wherein said aqueous solution is a brine.

14. The process of claim 13 wherein said brine contains sulfate ions.

15. The process of claim 2 further comprising:
   removing deleterious by-products of sulfonation from said aqueous solution prior to said contacting step.

16. The process of claim 2 wherein said copolymer has a molecular weight of from about 5,000 to about 30,000.

17. The process of claim 2 wherein said copolymer has a molecular weight of from about 10,000 to about 25,000.

18. The process of claim 2 wherein said copolymer has a polydispersity of less than about 2.0.

19. The process of claim 1 wherein said aqueous fluid has carbon dioxide dissolved therein.

20. The process of claim 1 wherein said copolymer has a molecular weight of from about 5,000 to about 30,000.

21. The process of claim 1 wherein said copolymer has a molecular weight of from about 10,000 to about 25,000.

22. The process of claim 1 wherein said copolymer has a polydispersity of less than about 2.0.

23. The process of claim 1 wherein said step of contacting is performed by metering an aqueous solution having said copolymer dissolved therein through a small diameter tube positioned within a well bore in fluid communication with said subterranean formation and into said aqueous fluid present in said well bore.

24. The process of claim 1 wherein said process further comprises:
   injecting said copolymer into a well bore in fluid communication with said subterranean formation, said copolymer being encapsulated prior to injection.

25. The process of claim 1 wherein said polyalkylene glycol mono- or di-methacrylate is polyethylene glycol monomethyacrylate.

* * * * *